(12) United States Patent
Juni

(10) Patent No.: US 7,817,886 B2
(45) Date of Patent: Oct. 19, 2010

(54) OPTICAL WAVEGUIDE FOR TOUCH PANEL AND TOUCH PANEL USING THE SAME

(75) Inventor: Noriyuki Juni, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 0 days.

(21) Appl. No.: 12/498,438

(22) Filed: Jul. 7, 2009

(65) Prior Publication Data

US 2010/0007633 A1    Jan. 14, 2010

Related U.S. Application Data

(60) Provisional application No. 61/082,987, filed on Jul. 23, 2008.

(30) Foreign Application Priority Data

Jul. 10, 2008   (JP) ............................... 2008-180533

(51) Int. Cl.
  *G02B 6/32*   (2006.01)
  *G06F 3/042*  (2006.01)
(52) U.S. Cl. .................. 385/33; 385/131; 345/175; 345/176
(58) Field of Classification Search ............... 385/14, 385/33, 50, 129–132; 345/173, 175, 176
See application file for complete search history.

(56) References Cited

U.S. PATENT DOCUMENTS

| 7,099,534 | B2 | 8/2006 | Kato et al. |
| 7,218,812 | B2 * | 5/2007 | Maxwell et al. ............... 385/33 |
| 2004/0201579 | A1 | 10/2004 | Graham |
| 2008/0198144 | A1 * | 8/2008 | Shimizu et al. ............. 345/175 |
| 2008/0252620 | A1 * | 10/2008 | Shimizu ..................... 345/176 |

FOREIGN PATENT DOCUMENTS

JP    2003-004960 A    1/2003

* cited by examiner

*Primary Examiner*—Daniel Petkovsek
(74) *Attorney, Agent, or Firm*—Westerman, Hattori, Daniels & Adrian, LLP

(57) ABSTRACT

An optical waveguide for a touch panel which eliminates the need for alignment between the optical waveguide and a lens device, and a touch panel using the same. An end portion of a light-emitting core for emitting light beams and an end portion of a light-receiving core for receiving emitted light beams are formed as first and third lens portions so as to protrude from edge portions of an over cladding layer and to be exposed to outside air. The first and third lens portions have lens surfaces which bulge outwardly. The over cladding layer includes second and fourth lens portions formed as extensions of the over cladding layer and corresponding to the first and third lens portions, with the second and fourth lens portions spaced apart from the lens surfaces of the first and third lens portions. The second and fourth lens portions have lens surfaces which bulge outwardly.

13 Claims, 7 Drawing Sheets

PRIOR ART

OPTICAL WAVEGUIDE FOR TOUCH PANEL AND TOUCH PANEL USING THE SAME

RELATED APPLICATIONS

This application claims the benefit of U.S. Provisional Application No. 61/082,987, filed Jul. 23, 2008, which is hereby incorporated by reference.

BACKGROUND OF THE INVENTION

1. Field of the Invention

The present invention relates to an optical waveguide for a touch panel and a touch panel using the same.

2. Description of the Related Art

A touch panel is an input device for operating an apparatus by directly touching a display screen of a liquid crystal display device or the like with a finger, a purpose-built stylus or the like. The touch panel includes a display which displays operation details and the like, and a detection means which detects the position (coordinates) of a portion of the display screen of the display touched with the finger or the like. Information indicating the touch position detected by the detection means is sent in the form of a signal to the apparatus, which in turn performs an operation and the like displayed on the touch position. Examples of the apparatus employing such a touch panel include ATMs in banking facilities, ticket vending machines in stations, portable game machines, and the like.

A detection means employing an optical waveguide is proposed as the detection means for detecting the portion touched with the finger and the like on the above-mentioned touch panel (see, for example, US Patent Application Laid-Open No. 2004/0201579A1).

Specifically, the touch panel includes optical waveguides provided around a periphery of a display screen of a rectangular display. The touch panel is configured such that a multiplicity of light beams parallel to the display screen of the display are emitted from a light-emitting portion of a light-emitting optical waveguide provided on a first side portion of the display screen of the display toward a second side portion, and the emitted light beams enter a light-receiving portion of a light-receiving optical waveguide provided on a second side portion. These optical waveguides cause the emitted light beams to travel in a lattice form on the display screen of the display. When a portion of the display screen of the display is touched with a finger in this state, the finger blocks some of the emitted light beams. Thus, the light-receiving optical waveguide senses a light blocked portion, whereby the position of the above-mentioned portion touched with the finger is detected.

On the other hand, the light beams emitted from an optical waveguide directly into the air diverge radially. In this state, optical transmission efficiency is low, and it is impossible to accurately detect the above-mentioned position of the portion touched with the finger. To solve the problem, an optical transmission device has been proposed in which the optical transmission efficiency is enhanced (see, for example, Japanese Patent Application Laid-Open No. 2003-4960). This conventional optical transmission device is schematically shown in FIGS. 7A and 7B. This optical transmission device includes an optical waveguide 100 and a lens device 20. The above-mentioned lens device 20 includes a mounting surface portion 21 for placing the optical waveguide 100 thereon, and a thick strip-shaped lens 22 formed to protrude from a front edge portion of this mounting surface portion 21. This strip-shaped lens 22 has a lens surface (a right-hand surface shown) of an arcuate configuration as seen in sectional side view so as to bulge outwardly (with reference to FIG. 7B). The above-mentioned optical waveguide 100 includes an under cladding layer 12, cores 13, and an over cladding layer 14 which are stacked in the order named. Each of the above-mentioned cores 13 has a front end portion formed as a lens portion 130 of a semicircular configuration as seen in plan view and exposed to the outside. This lens portion 130 has a lens surface (a front end surface) of an arcuate configuration as seen in plan view so as to bulge outwardly (with reference to FIG. 7A). In such an optical transmission device, when light beams S emitted from each of the cores 13 pass through the lens portion 130 provided in the front end portion of each of the cores 13, the light beams S are restrained from diverging in a direction parallel to the mounting surface of the above-mentioned mounting surface portion 21 (a horizontal direction) by refraction through the lens portion 130 of the semicircular configuration as seen in plan view. Thereafter, when the light beams S pass through the strip-shaped lens 22 of the above-mentioned lens device 20, the light beams S are restrained from diverging in a direction orthogonal to the above-mentioned mounting surface portion 21 (a vertical direction) by refraction through the strip-shaped lens 22 of the arcuate configuration as seen in sectional side view. The use of such an optical transmission device with enhanced optical transmission efficiency as an optical waveguide device for a touch panel enables the touch panel to accurately detect the position of the portion touched with the finger.

In the above-mentioned conventional optical transmission device, however, it is necessary to bond the optical waveguide 100 and the lens device 20 to each other, with accurate alignment achieved between the lens portion 130 provided in the front end portion of each of the cores 13 of the optical waveguide 100 and the strip-shaped lens 22 of the lens device 20. Unless the alignment is performed accurately, the divergence of the light beams S is not appropriately restrained on the light-emitting side, and, consequently, the position of the portion of the display screen of the display touched with the finger cannot be detected accurately. However, the accurate alignment requires precision and is hence difficult. It is labor- and time-consuming to achieve the accurate alignment.

DISCLOSURE OF THE INVENTION

In view of the foregoing, it is an object of the present invention to provide an optical waveguide for a touch panel which eliminates the need for alignment between the optical waveguide and a lens device, and to provide a touch panel using the same.

To accomplish the above-mentioned object, a first aspect of the present invention is intended for an optical waveguide for a touch panel, comprising: cores, and an over cladding layer formed so as to cover the cores, the optical waveguide being provided along a peripheral portion of a display screen of a display of the touch panel, the cores including a light-emitting core for emitting light beams and having an end portion positioned in a first side portion of the display screen of said display, the end portion of said light-emitting core being formed as a first lens portion in such a manner as to protrude from an edge portion of said over cladding layer and to be exposed to the outside air, said first lens portion having a first lens surface of an arcuate shape as seen in plan view which bulges outwardly, the over cladding layer including a second lens portion formed as an extension of said over cladding layer and corresponding to said first lens portion, said second lens portion being spaced apart from the first lens surface of said first lens portion, said second lens portion having a second lens surface of an arcuate shape as seen in sectional side view which bulges outwardly.

A second aspect of the present invention is intended for a touch panel comprising the above-mentioned optical waveguide for the touch panel, the optical waveguide being provided along a peripheral portion of a display screen of a display of the touch panel, wherein a light-emitting core for emitting light beams includes a first lens portion having a lens surface positioned in a first side portion of the display screen of said display, and a light-receiving core for receiving the emitted light beams has an end surface positioned in a second side portion of the display screen of said display.

To solve the above-mentioned problem, the present inventor has discovered the idea of forming the core end portion as the first lens portion and thereafter forming the second lens portion as the extension of the over cladding layer in front of the above-mentioned first lens portion when the over cladding layer is formed. Since the cores and the over cladding layer are originally integral, this allows the optical waveguide for the touch panel according to the present invention to achieve alignment between the first lens portion provided in the core end portion and the second lens portion as the extension of the over cladding layer when the over cladding layer is formed.

In the optical waveguide for the touch panel according to the present invention, the end portion of the light-emitting core is formed as the first lens portion having the lens surface of an arcuate shape as seen in plan view which bulges outwardly, and the second lens portion having a lens surface of an arcuate shape as seen in sectional side view which bulges outwardly is formed as the extension of the over cladding layer, the second lens portion being spaced apart from the lens surface of the first lens portion. Thus, the optical waveguide for the touch panel according to the present invention is capable of achieving automatic alignment between the first lens portion provided in the core end portion and the second lens portion including the extension of the over cladding layer when the over cladding layer is formed. This eliminates the need for the process of aligning the above-mentioned first lens portion and the second lens portion with each other to improve productivity.

Further, when the above-mentioned first lens portion has a width increasing gradually toward an end surface thereof closer to the above-mentioned second lens portion to have a substantially sectorial shape, and an arcuate surface portion of the substantially sectorial shape is formed as the above-mentioned first lens surface, then the light beams coming from the basal portion of the above-mentioned first lens portion into the widened portion thereof diverge substantially uniformly along the shape of the widened portion, and the light beams reach the lens surface at the end surface substantially uniformly. This allows the emission of wide light beams from the lens surface of the above-mentioned first lens portion, with the intensity of the light beams maintained substantially uniformly across the width thereof. As a result, if the position of a finger having touched the display screen of the display in the touch panel is slightly deviated from a predetermined position, the position of the portion touched with the finger is appropriately detected because of the above-mentioned wide light beams.

Further, when the cores include a light-receiving core for receiving the above-mentioned emitted light beams and having an end portion positioned in a second side portion of the display screen of the above-mentioned display, the end portion of the above-mentioned light-receiving core is formed as a third lens portion in such a manner as to protrude from another edge portion of the above-mentioned over cladding layer and to be exposed to the outside air, the above-mentioned third lens portion has a third lens surface of an arcuate shape as seen in plan view which bulges outwardly, the over cladding layer further includes a fourth lens portion formed as another extension of the above-mentioned over cladding layer and corresponding to the above-mentioned third lens portion, the above-mentioned fourth lens portion being spaced apart from the third lens surface of the above-mentioned third lens portion, and the above-mentioned fourth lens portion has a fourth lens surface of an arcuate shape as seen in sectional side view which bulges outwardly, then automatic alignment is achieved between the third lens portion and the fourth lens portion when the over cladding layer is formed in a manner similar to that between the above-mentioned first and second lens portions on the light-emitting side. This improves productivity.

Also, when the above-mentioned third lens portion has a width increasing gradually toward an end surface thereof closer to the fourth lens portion to have a substantially sectorial shape, and an arcuate surface portion of the substantially sectorial shape is formed as the above-mentioned third lens surface, then it is easy for light beams to enter the lens surface of the third lens portion because the lens surface of the above-mentioned third lens portion is wide. This enhances optical transmission efficiency to achieve more accurate detection of the position of a finger having touched the display screen of the display in the touch panel.

The touch panel according to the present invention includes the above-mentioned optical waveguide for the touch panel. Thus, the light beams emitted from the end surface of the core are restrained from diverging. This achieves the accurate detection of the position of a finger having touched the display screen of the display.

DETAILED DESCRIPTION OF THE INVENTION

Next, embodiments according to the present invention will now be described in detail with reference to the drawings.

Figure 1A:
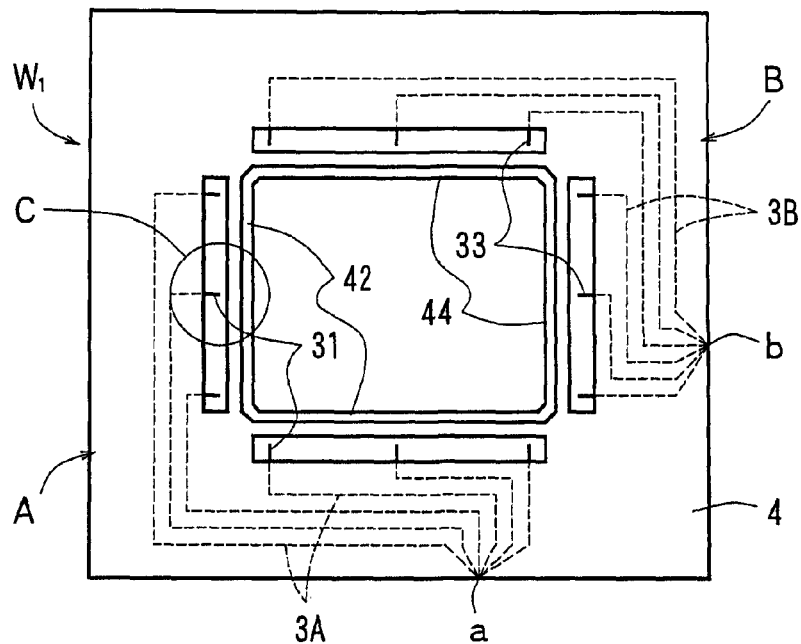
FIG. 1A is a plan view schematically showing an optical waveguide for a touch panel according to a first embodiment of the present invention.
Figure 1B:
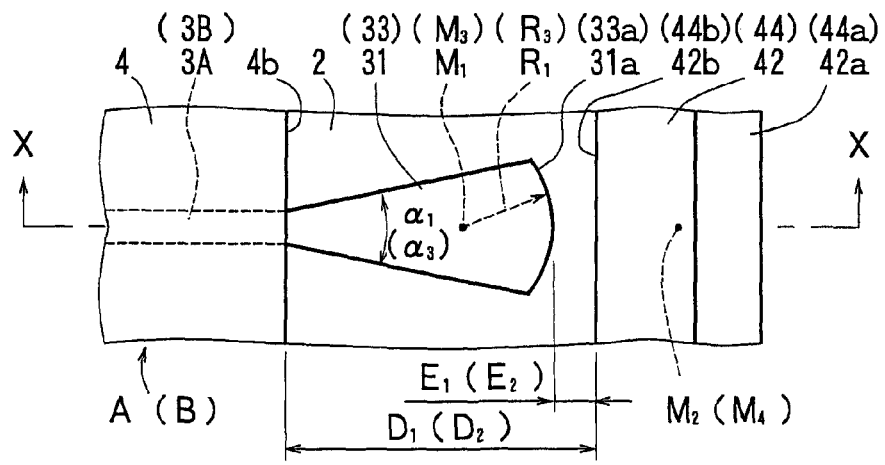
FIG. 1B is an enlarged view of an end portion of a core enclosed with a circle C of FIG. 1A.
Figure 1C:
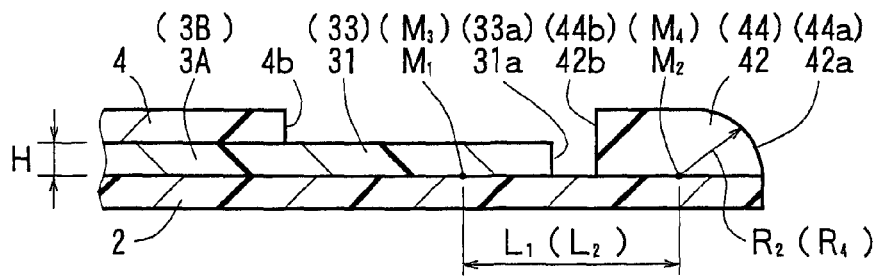
FIG. 1C is a sectional view taken along the line X-X of FIG. 1B.

FIGS. 1A to 1C show an optical waveguide for a touch panel according to a first embodiment of the present invention. The optical waveguide $W_1$ for the touch panel according to this embodiment is in the form of a rectangular frame as seen in plan view, as shown in FIG. 1A. One L-shaped portion constituting the rectangular frame is a light-emitting optical waveguide portion A, and the other L-shaped portion is a light-receiving optical waveguide portion B. The above-mentioned optical waveguide $W_1$ for the touch panel includes an under cladding layer (body) 2 in the form of a rectangular frame, and a plurality of cores 3A and 3B serving as a passageway for light and formed on predetermined portions of the surface of the under cladding layer 2, the plurality of cores 3A and 3B being patterned to extend from predetermined portions a and b provided at outer end edges of the above-mentioned respective L-shaped portions to inner end edges of the L-shaped portions [on the display screen side of a display 11 (see FIG. 2)] and to be arranged in a parallel, equally spaced relationship. The number of cores 3A formed in the light-emitting optical waveguide portion A is equal to the number of cores 3B formed in the light-receiving optical waveguide portion B. Further, end surfaces of the light-emitting cores 3A are in face-to-face relationship with end surfaces of the light-receiving cores 3B. As shown in FIG. 1B (an enlarged view of a circular portion C of FIG. 1A) and in FIG. 1C (a sectional view taken along the line X-X of FIG. 1B), each of the above-mentioned light-emitting cores 3A has an end portion formed as a first lens portion 31 of a substantially sectorial shape, and each of the light-receiving cores 3B has an end portion formed as a third lens portion 33 in this embodiment. Since these are identical in shape and the like with each other, the first lens portion 31 and the third lens portion 33 are illustrated in FIGS. 1B and 1C in conjunction with each other (ditto for other portions). Specifically, the first and third lens portions 31 and 33 have a width increasing gradually toward an end surface (a right-hand end surface shown) thereof to have a substantially sectorial shape, and an arcuate surface portion of the substantially sectorial shape thereof is formed as an arcuate lens surface 31a (33a) as seen in plan view which bulges outwardly. The cores 3A (3B) including the above-mentioned first and third lens portions 31 and 33 are formed to have a uniform height. An over cladding layer 4 having a uniform height is formed on the surface of the above-mentioned under cladding layer 2 so as to cover portions of the cores 3A (3B) except the above-mentioned first and third lens portions 31 and 33. The above-mentioned first and third lens portions 31 and 33 protrude from an edge portion 4b of the above-mentioned over cladding layer 4 and are exposed to the outside air. Additionally, a second lens portion 42 including an extension of the above-mentioned over cladding layer 4 is spaced apart from the lens surface 31a of each of the above-mentioned first lens portions 31, and is formed on the surface of the above-mentioned under cladding layer 2 so as to extend in a strip-shaped configuration along a row in which the above-mentioned first lens portions 31 are arranged. Similarly, a fourth lens portion 44 including another extension of the above-mentioned over cladding layer 4 is spaced apart from the lens surface 33a of each of the above-mentioned third lens portions 33, and is formed on the surface of the above-mentioned under cladding layer 2 so as to extend in a strip-shaped configuration along a row in which the above-mentioned third lens portions 33 are arranged. The above-mentioned second and fourth lens portions 42 and 44 have an end surface (a right-hand end surface shown) formed as an arcuate lens surface 42a (44a) as seen in sectional side view which bulges outwardly. In FIG. 1A, the cores 3A and 3B are indicated by solid and broken lines, and the thickness of the solid and broken lines indicates the thickness of the cores 3A and 3B. Also, the number of cores 3A and 3B are shown as abbreviated.

Figure 2:
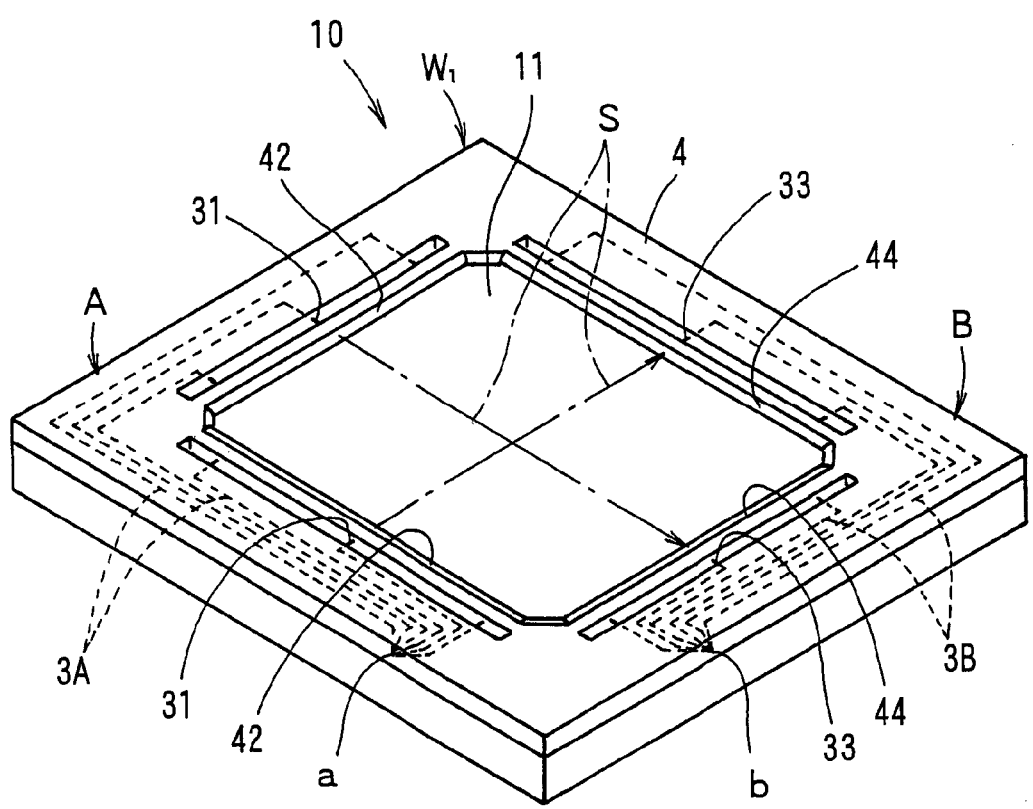
FIG. 2 is a perspective view schematically showing a touch panel using the above-mentioned optical waveguide for the touch panel.

As shown in FIG. 2, the above-mentioned optical waveguide $W_1$ for the touch panel in the form of the rectangular frame is provided along the rectangular shape of the periphery of the display screen of the rectangular display 11 of a touch panel 10 so as to surround the display screen of the rectangular display 11. In the predetermined portion a provided at the outer end edge of the above-mentioned light-emitting optical waveguide portion A, a light source (not shown) such as a light-emitting element and the like is connected to the cores 3A. In the predetermined portion b provided at the outer end edge of the light-receiving optical waveguide portion B, a detector (not shown) such as a light-receiving element and the like is connected to the cores 3B. In FIG. 2 as in FIG. 1A, the cores 3A and 3B are indicated by solid and broken lines, and the thickness of the solid and broken lines indicates the thickness of the cores 3A and 3B. Also, the number of cores 3A and 3B are shown as abbreviated. Only some of a multiplicity of light beams S are shown in FIG. 2 for ease of understanding.

Figure 3A:
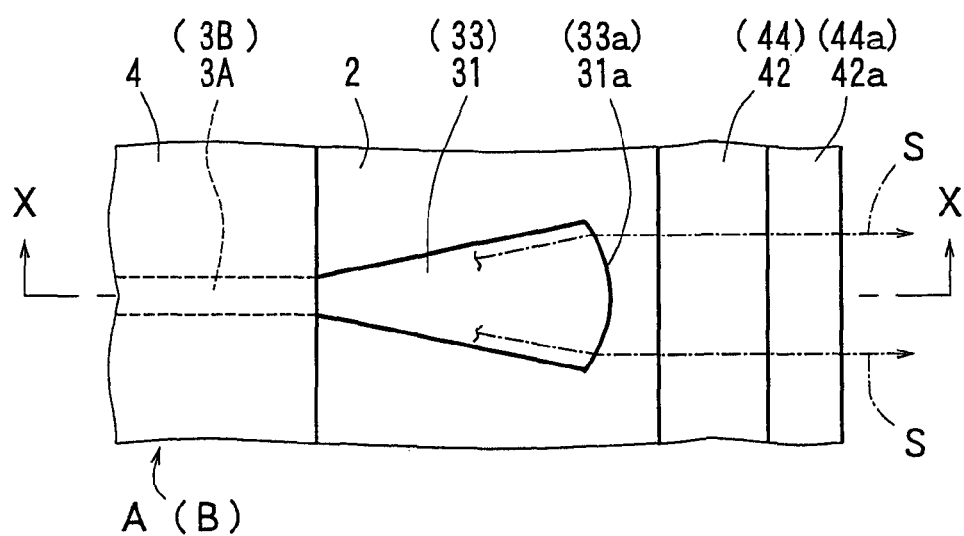
FIG. 3A is a plan view schematically showing the emission of light beams from the above-mentioned optical waveguide for the touch panel.
Figure 3B:
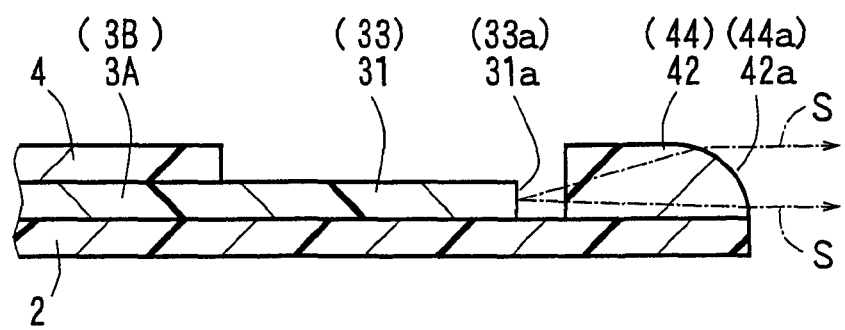
FIG. 3B is a sectional view taken along the line X-X of FIG. 3A.

In the light-emitting optical waveguide portion A, as shown in FIG. 3A (a plan view) and in FIG. 3B (a sectional view taken along the line X-X of FIG. 3A), the light beams S emitted from the end portion of the core 3A diverge substantially uniformly along the shape of a widened portion of the substantially sectorial shape because of the substantially sectorial shape of the first lens portion 31 provided in the end portion thereof. Further, the light beams S are restrained from diverging in a horizontal direction (leftward and rightward directions) (with reference to FIG. 3A) relative to the direction of travel of the light beams S by refraction through the first lens portion 31 resulting from the shape (arcuate as seen in plan view) of the lens surface 31a. Then, the light beams S held widened in corresponding relation to the above-mentioned lens surface 31a are emitted from the lens surface 31a of the first lens portion 31 to an outside air portion. At this time, since the light beams S are emitted to the outside air portion, the above-mentioned divergence of the light beams S is easily restrained because of a difference in refractive index between the first lens portion 31 and the above-mentioned outside air portion. Subsequently, the light beams S enter the second lens portion 42 through a rear surface (a surface opposite from the lens surface 42a) 42b of the second lens portion 42, and are restrained from diverging in a vertical direction (upward and downward directions) (with reference to FIG. 3B) relative to the direction of travel of the light beams S by refraction through the second lens portion 42 resulting from the shape (arcuate as seen in sectional side view) of the lens surface 42a. Then, the light beams S are emitted from the lens surface 42a of the second lens portion 42. That is, on the light-emitting side, the light beams S are emitted from the lens surface 42a of the above-mentioned second lens portion 42 and travel along the display screen of the above-mentioned display 11 (with reference to FIG. 2), with the divergence of the light beams S restrained in a horizontal direction and in a vertical direction relative to the direction of travel of the light beams S by refraction through the above-mentioned two lens portions (the first lens portion 31 and the second lens portion 42).

In the light-receiving optical waveguide portion B, on the other hand, the light beams S having traveled over the display screen of the above-mentioned display 11 (with reference to FIG. 2) travel in a direction opposite from that shown in FIGS. 3A and 3B. Specifically, the light beams S enter the lens surface 44a of the fourth lens portion 44, and are further narrowed down and converged in a vertical direction relative to the direction of travel of the light beams S by refraction through the fourth lens portion 44 resulting from the shape (arcuate as seen in sectional side view) of the lens surface 44a. Then, the light beams S are emitted from a rear surface [a surface opposite from the lens surface 44a] 44b of the fourth lens portion 44 to the outside air portion. At this time, since the light beams S are emitted to the outside air portion, the light beams S are easily converged because of a difference in refractive index between the fourth lens portion 44 and the above-mentioned outside air portion. Subsequently, the light beams S efficiently enter the third lens portion 33 through the widened lens surface 33a because of the substantially sectorial shape of the third lens portion 33. Then, the light beams S are further narrowed down and converged in a horizontal direction relative to the direction of travel of the light beams S by refraction through the third lens portion 33 resulting from the shape (arcuate as seen in plan view) of the lens surface 33a. That is, on the light-receiving side, the light beams S travel toward the interior of the core 3B, with the convergence of the light beams S held in a vertical direction and in a horizontal direction relative to the direction of travel of the light beams S by refraction through the above-mentioned two lens portions [the fourth lens portion 44 and the third lens portion 33]. In this embodiment, the above-mentioned third and fourth lens portions 33 and 44 for narrowing down and converging the light beams S are formed on the light-receiving side. This allows the enhancement of optical transmission efficiency without the need to emit the narrowed light beams from the first and second lens portions 31 and 42 on the light-emitting side.

Since such optical transmission is done in the optical waveguide $W_1$ for the touch panel shown in FIG. 2, the light beams S travel in a lattice form on the display screen of the display 11 of the touch panel 10 as shown in FIG. 2, with the divergence of the light beams S restrained in the horizontal direction and in the vertical direction relative to the direction of travel of the light beams S (although only some of the light beams S forming the lattice are shown in FIG. 2 for ease of understanding). Thus, when the display screen of the display 11 is touched with a finger in this state, the position of a portion touched with the above-mentioned finger is accurately detected.

In the above-mentioned optical waveguide $W_1$ for the touch panel which functions appropriately in this manner, with reference to FIGS. 1A to 1C, the width $D_1$ of the outside air portion to which the first lens portion 31 is exposed, and the width ($D_2$) of the outside air portion to which the third lens portion 33 is exposed are typically in the range of 50 to 3000 μm. The clearance $E_1$ between the lens surface 31a of the first lens portion 31 and the second lens portion 42, and the clearance ($E_2$) between the lens surface 33a of the third lens portion 33 and the fourth lens portion 44 are typically in the range of 10 to 20000 μm. Further, the central angle (taper angle) $\alpha_1$ ($\alpha_3$) of the widened portion of the substantially sectorial shape of the first and third lens portions 31 and 33 is typically in the range of 5 to 50 degrees.

For the display of more information about manipulations and the like on the display screen of the display 11 in the above-mentioned touch panel 10 shown in FIG. 2, it is necessary to make the detectability of the finger position more precise. In this case, during the above-mentioned optical transmission, the suppression of the divergence of the light beams S emitted from the light-emitting side is made more appropriate, and the convergence of the light beams S on the light-receiving side is also made more appropriate, whereby the optical transmission efficiency is further enhanced. To this end, the dimensions of the above-mentioned first to fourth lens portions 31, 42, 33 and 44 are determined as follows. Specifically, with reference to FIGS. 1A to 1C, when the height H of the cores 3A and 3B is within a range given by the expression (a) to be described below, a distance $L_1$ from the center of curvature $M_1$ of the lens surface 31a of the above-mentioned first lens portion 31 to the center of curvature $M_2$ of the lens surface 42a of the above-mentioned second lens portion 42 is within a range given by the expression (b) to be described below, the radius of curvature $R_1$ of the lens surface 31a of the above-mentioned first lens portion 31 is within a range given by the expression (c) to be described below, and the radius of curvature $R_2$ of the lens surface 42a of the above-mentioned second lens portion 42 is within a range given by the expression (d) to be described below. Also, a distance ($L_2$) from the center of curvature ($M_3$) of the lens surface 33a of the above-mentioned third lens portion 33 to the center of curvature ($M_4$) of the lens surface 44a of the above-mentioned fourth lens portion 44 is within a range given by the expression (e) to be described below, the radius of curvature ($R_3$) of the lens surface 33a of the above-mentioned third lens portion 33 is within a range given by the expression (f) to be described below, and the radius of curvature ($R_4$) of the lens surface 44a of the above-mentioned fourth lens portion 44 is within a range given by the expression (g) to be described below. The following expressions (a) to (g) represent ranges obtained by the present inventor after repeated experiments.

(a) $10 \text{ μm} \leq H \leq 100 \text{ μm}$
(b) $400 \text{ μm} < L_1 < 10000 \text{ μm}$
(c) $50 \text{ μm} < R_1 < 6000 \text{ μm}$
(d) $300 \text{ μm} < R_2 < 10000 \text{ μm}$
(e) $400 \text{ μm} < L_2 < 10000 \text{ μm}$
(f) $50 \text{ μm} < R_3 < 6000 \text{ μm}$
(g) $300 \text{ μm} < R_4 < 10000 \text{ μm}$ This makes the suppression of the divergence of the light beams S emitted from the lens surface 42a of the second lens portion 42 more appropriate in the light-emitting optical waveguide portion A with reference to FIGS. 3A and 3B to cause the emitted light beams S to become parallel light beams or close to parallel light beams, that is, light beams neither spreading too wide nor narrowing down too much. As a result, in the light-receiving optical waveguide portion B, the width of the area of a light-receiving region in the fourth lens portion 44 is made more appropriate. In the light-receiving optical waveguide portion B, the light beams S incident on the lens surface 44a of the fourth lens portion 44 are converged more appropriately. This allows all or most of the incident light beams S to propagate through the core 3B.

The dimensions and the like of the above-mentioned optical waveguide $W_1$ for the touch panel in the form of the rectangular frame may be determined to conform to the size of the display 11 of the touch panel 10, as shown in FIG. 2. For example, the vertical and horizontal lengths of the frame are on the order of 30 to 300 mm, and the frame width is on the order of 50 μm to 2 mm. The number of cores 3A emitting the light beams S (cores 3B receiving the light beams S) may be determined according to the number of manipulation details and the like to be displayed on the display screen of the display 11, and is, for example, on the order of 20 to 100.

Next, an example of a manufacturing method of the above-mentioned optical waveguide $W_1$ for the touch panel will be described. FIGS. 4A to 4D and FIGS. 5A to 5D to which reference is made in this description show the manufacturing method mainly about the first to fourth lens portions 31, 42, 33 and 44 shown in FIGS. 1A to 1C and a peripheral portion thereof. The first to fourth lens portions 31, 42, 33 and 44 are identical in shape and the like on the light-emitting side and on the light-receiving side, and are hence illustrated as those in conjunction with each other.

First, a base 1 of a flat shape (with reference to FIG. 4A) for use in the manufacture of the above-mentioned optical waveguide $W_1$ for the touch panel is prepared. Examples of a material for the formation of the base 1 include glass, quartz, silicon, resins, metals and the like. The thickness of the base 1 is, for example, in the range of 20 μm to 5 mm.

Figure 4A:
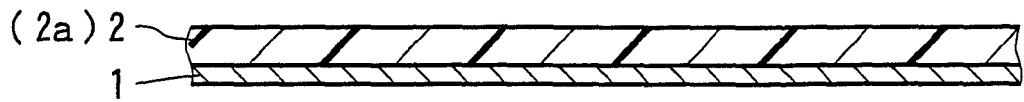
FIGS. 4A to 4D are illustrations schematically showing a manufacturing method of the above-mentioned optical waveguide for the touch panel.

Then, as shown in FIG. 4A, a varnish prepared by dissolving a photosensitive resin in a solvent, which serves as a material for the formation of the under cladding layer 2, is applied to a predetermined region on the above-mentioned base 1. Examples of the above-mentioned photosensitive resin include a photosensitive epoxy resin, and the like. The application of the above-mentioned varnish is achieved, for example, by a spin coating method, a dipping method, a casting method, an injection method, an ink jet method and the like. Then, the varnish is dried by a heating treatment at 50 to 120° C. for 10 to 30 minutes. This provides a photosensitive resin layer 2a which is to be formed into the under cladding layer 2.

Next, the above-mentioned photosensitive resin layer 2a is exposed to irradiation light. Examples of the irradiation light for the above-mentioned exposure used herein include visible light, ultraviolet light, infrared light, X-rays, alpha rays, beta rays, gamma rays and the like. Preferably, ultraviolet light is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically in the range of 10 to 10000 $mJ/cm^2$.

After the above-mentioned exposure, a heating treatment is performed to complete a photoreaction. This heating treatment is typically performed at 80 to 250° C. for 10 seconds to two hours. This causes the above-mentioned photosensitive resin layer 2a to be formed into the under cladding layer 2. The thickness of the under cladding layer 2 (the photosensitive resin layer 2a) is typically in the range of 1 to 50 μm.

Figure 4B:
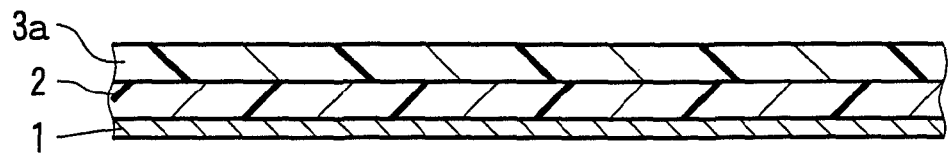

Then, as shown in FIG. 4B, a photosensitive resin layer 3a to be formed into the cores 3A (3B) is formed on the surface of the above-mentioned under cladding layer 2. The formation of this photosensitive resin layer 3a is carried out in a manner similar to the method for the formation of the photosensitive resin layer 2a formed into the under cladding layer 2 described with reference to FIG. 4A. A material for the formation of the cores 3A (3B) used herein is a material having a refractive index greater than that of the materials for the formation of the above-mentioned under cladding layer 2 and the over cladding layer 4 (with reference to FIG. 1C) to be described later. The adjustment of this refractive index may be made, for example, by adjusting the selection of the types of the materials for the formation of the above-mentioned under cladding layer 2, the cores 3A (3B) and the over cladding layer 4, and the composition ratio thereof.

Next, an exposure mask formed with an opening pattern corresponding to the pattern of the cores 3A (3B) [including the first and third lens portions 31 and 33] is placed over the above-mentioned photosensitive resin layer 3a. Then, the above-mentioned photosensitive resin layer 3a is exposed to irradiation light through the exposure mask. Thereafter, a heating treatment is performed. The exposure and the heating treatment are carried out in a manner similar to those in the method for the formation of the under cladding layer 2 described with reference to FIG. 4A.

Figure 4C:
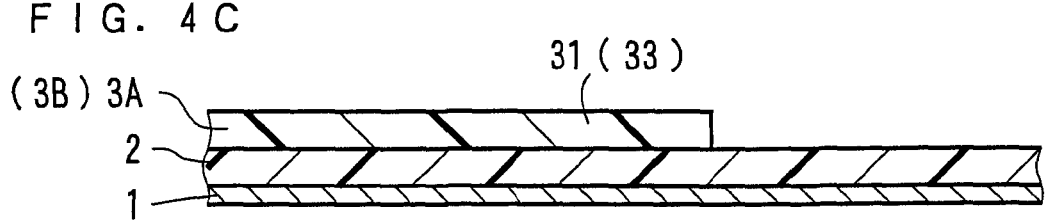

Subsequently, development is performed using a developing solution to dissolve away an unexposed portion of the above-mentioned photosensitive resin layer 3a (with reference to FIG. 4B), thereby forming the photosensitive resin layer 3a remaining on the under cladding layer 2 into the pattern of the cores 3A (3B), as shown in FIG. 4C. The above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of a photosensitive resin composition.

After the above-mentioned development, the developing solution remaining on the surface and the like of the remaining photosensitive resin layer 3a formed in the pattern of the cores 3A (3B) is removed by a heating treatment. This heating treatment is typically performed at 80 to 120° C. for 10 to 30 minutes. This causes the remaining photosensitive resin layer 3a formed in the pattern of the above-mentioned cores 3A (3B) to be formed into the cores 3A (3B) [including the first and third lens portions 31 and 33]. The thickness (height) of the cores 3A (3B) (the photosensitive resin layer 3a) is typically in the range of 10 to 100 μm, and the width of the cores 3A (3B) [except the widened portion of the substantially sectorial shape of the first and third lens portions 31 and 33] is typically in the range of 8 to 50 μm.

Figure 4D:
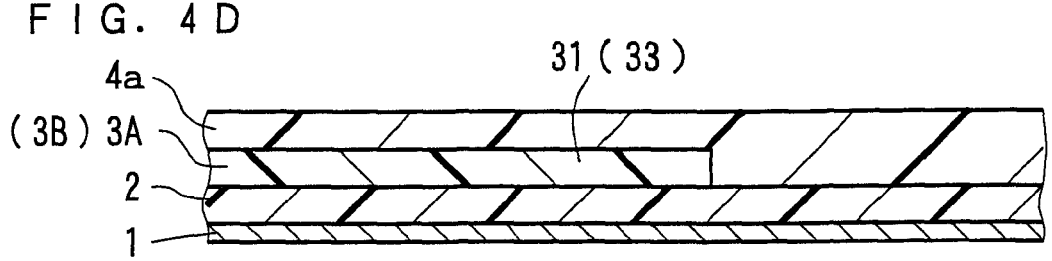

Then, as shown in FIG. 4D, a photosensitive resin to be formed into the over cladding layer 4 is applied to the surface of the above-mentioned under cladding layer 2 so as to cover the cores 3A (3B) to form a photosensitive resin layer (unhardened) 4a. An example of the photosensitive resin to be formed into this over cladding layer 4 includes a photosensitive resin similar to that of the above-mentioned under cladding layer 2.

Figure 5A:
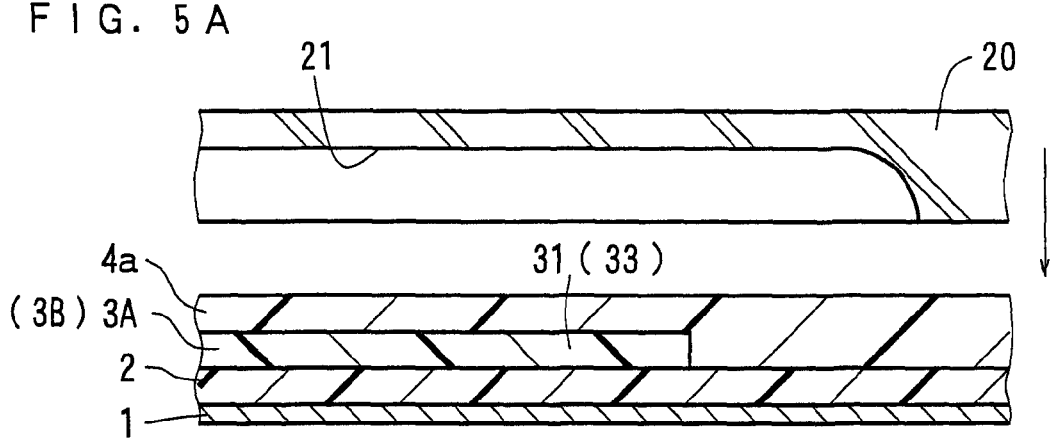
FIGS. 5A to 5D are illustrations schematically showing a continuation of the manufacturing method of the above-mentioned optical waveguide for the touch panel.
Figure 5B:
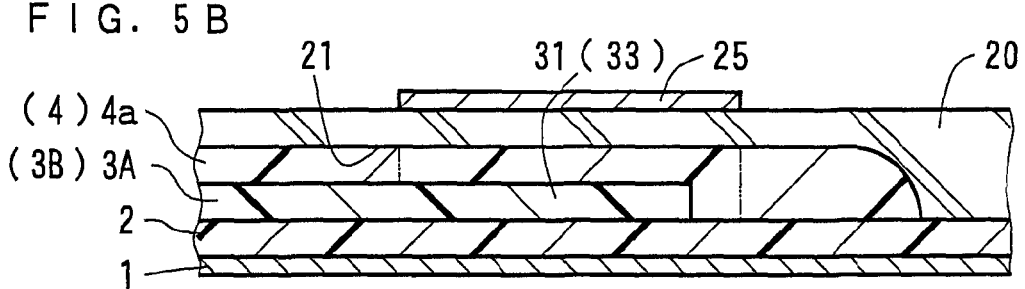
Figure 5C:
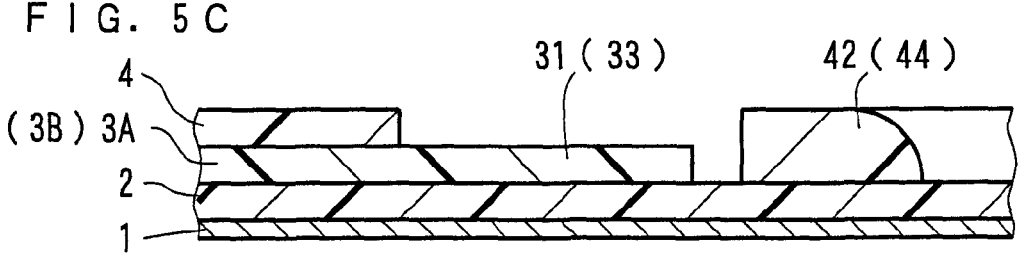

Then, as shown in FIG. 5A, a molding die 20 for press molding the over cladding layer 4 into the rectangular frame shape. This molding die 20 is made of a material (for example, quartz) permeable to irradiation light such as ultraviolet light and the like, and is formed with a recessed portion having a die surface 21 complementary in shape to the surface of the over cladding layer 4 including the above-mentioned second and fourth lens portions 42 and 44. Then, as shown in FIG. 5B, the molding die 20 is pressed against the above-mentioned photosensitive resin layer 4a so that the die surface (the recessed portion) 21 of the above-mentioned molding die 20 is positioned in a predetermined position relative to the above-mentioned cores 3A (3B), to mold the photosensitive resin layer 4a into the shape of the over cladding layer 4. Next, a light shielding mask 25 is placed on a surface portion of the above-mentioned molding die 20 corresponding to a portion where the over cladding layer 4 is not formed [a portion where the above-mentioned first and third lens portions 31 and 33 are exposed to the outside air]. In this state, exposure to irradiation light such as ultraviolet light and the like is performed through the above-mentioned molding die 20. Thereafter, a heating treatment is performed. The exposure and the heating treatment are carried out in a manner similar to those in the method for the formation of the under cladding layer 2 described with reference to FIG. 4A. Then, after the molding die 20 is removed, development is performed using a developing solution. This dissolves away an unexposed portion (a portion corresponding to the above-mentioned light shielding mask 25) of the above-mentioned photosensitive resin layer 4a to expose the above-mentioned first and third lens portions 31 and 33 to the outside air, as shown in FIG. 5C. After the above-mentioned development, a heating treatment is performed. The development and the heating treatment are carried out in a manner similar to those in the method for the formation of the cores 3A (3B) described with reference to FIG. 4C. This provides the over cladding layer 4 [including the second and fourth lens portions 42 and 44] in the form of the rectangular frame. The height of the over cladding layer 4 is typically in the range of 50 to 2000 μm.

In this manner, the second and fourth lens portions 42 and 44 are formed as extensions of the over cladding layer 4. Thus, the first and third lens portions 31 and 33 provided in the end portions of the cores 3A (3B) and the second and fourth lens portions 42 and 44 including the extensions of the over cladding layer 4 are positioned relative to each other, when the over cladding layer 4 is formed. When the under cladding layer 2 and the over cladding layer 4 are made of the same material, the under cladding layer 2 and the over cladding layer 4 are integrated together at the contact portions thereof.

Figure 5D:
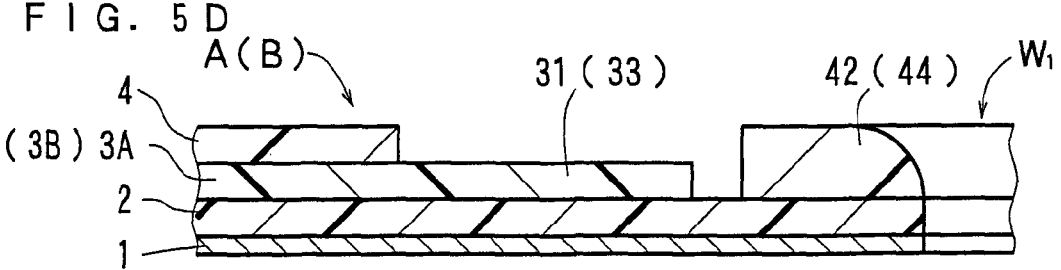

Thereafter, as shown in FIG. 5D, the under cladding layer 2 and the like together with the base 1 are cut into the rectangular frame shape by punching using a blade and the like. Thus, the optical waveguide $W_1$ for the touch panel in the form of the rectangular frame and including the under cladding layer 2, the cores 3A (3B), and the over cladding layer 4 [including the second and fourth lens portions 42 and 44] described above is manufactured on the surface of the base 1. This optical waveguide $W_1$ for the touch panel is used after being removed from the above-mentioned base 1 (with reference to FIG. 1C).

In the above-mentioned first embodiment, the first and third lens portions 31 and 33 provided in the end portions of the cores 3A and 3B are formed in the substantially sectorial shape such that the width thereof increases gradually toward the end surface thereof. However, the above-mentioned first and third lens portions 31 and 33 may be formed to have a uniform width if the optical waveguide $W_1$ for the touch panel is able to achieve appropriate optical transmission between the light-emitting side and the light-receiving side.

Also, in the above-mentioned first embodiment, the second and fourth lens portions 42 and 44 are formed in the strip shape. However, the second and fourth lens portions 42 and 44 may be formed as a plurality of pieces in such a manner that a second lens portion 42 in the form of a single piece is formed for each of the first lens portions 31.

Figure 6A:
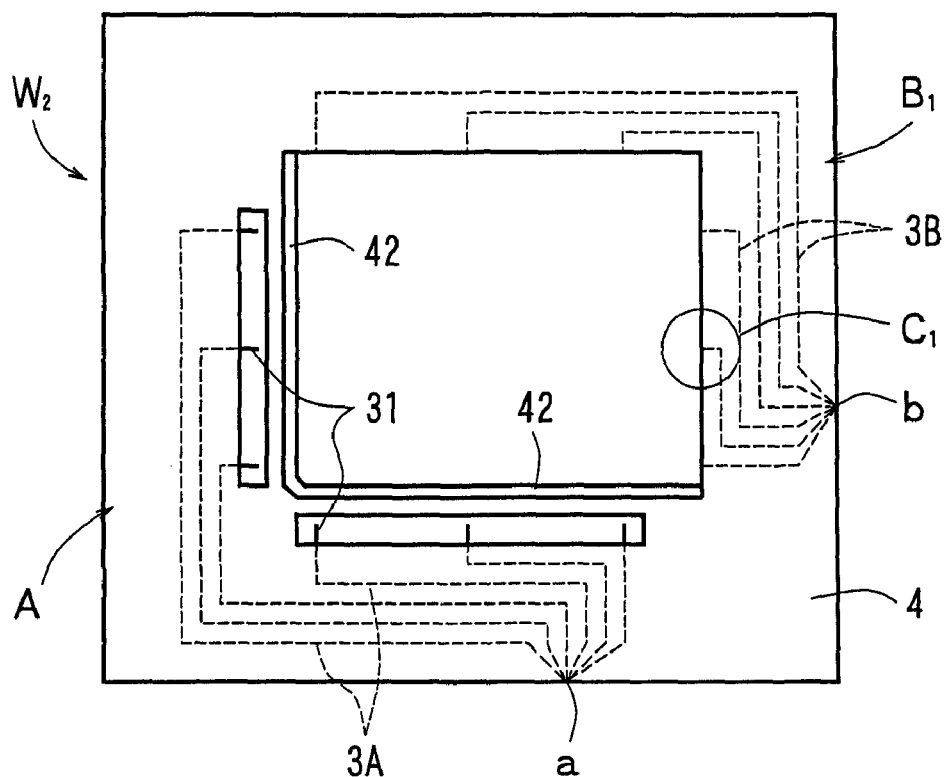
FIG. 6A is a plan view schematically showing an optical waveguide for a touch panel according to a second embodiment of the present invention.
Figure 6B:
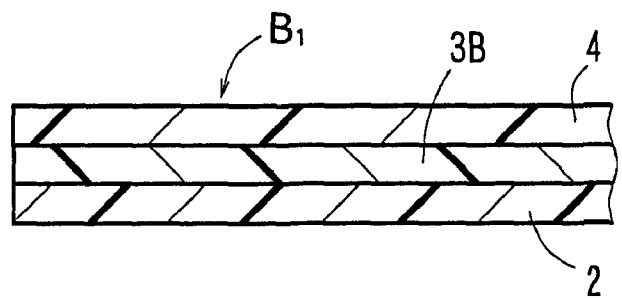
FIG. 6B is an enlarged sectional view of an end portion of a light-receiving core enclosed with a circle $C_1$ of FIG. 6A.
Figure 7A:
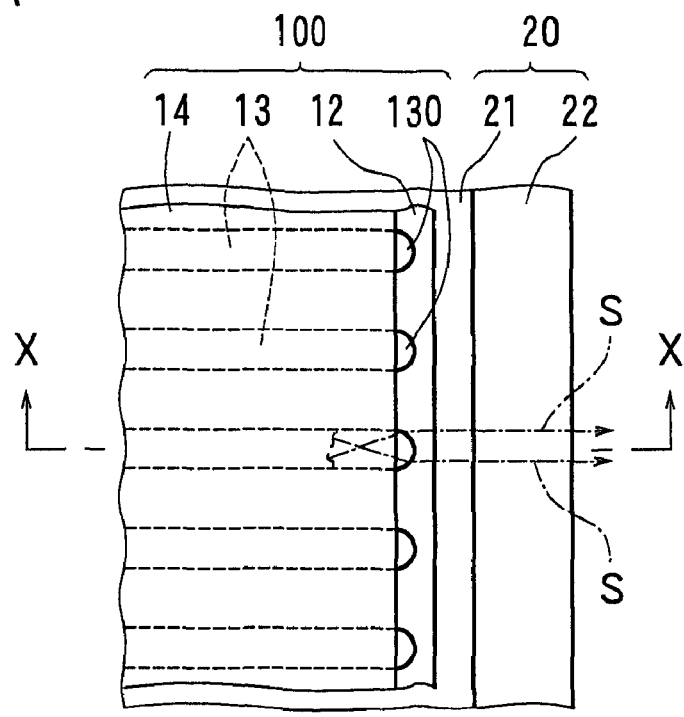
FIG. 7A is a plan view schematically showing a conventional optical transmission device.
Figure 7B:
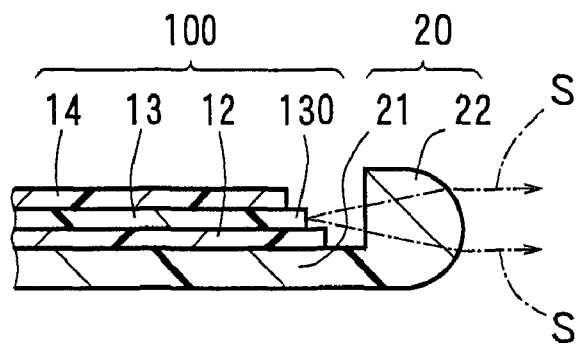
FIG. 7B is a sectional view taken along the line X-X of FIG. 7A.

FIGS. 6A and 6B show an optical waveguide for a touch panel according to a second embodiment of the present invention. The optical waveguide $W_2$ for the touch panel according to this embodiment is such that a light-receiving optical waveguide portion $B_1$ is not formed with the above-mentioned third and fourth lens portions 33 and 44 (with reference to FIGS. 1A to 1C) so that the end surfaces of the light-receiving cores 3B are exposed or uncovered at an edge surface of the over cladding layer 4. Other parts are similar to those of the above-mentioned first embodiment, and like reference numerals and characters are used to designate similar parts.

In this embodiment, the light beams S restrained from diverging in a horizontal direction and in a vertical direction relative to the direction of travel of the light beams S are emitted from the second lens portion 42 of the light-emitting optical waveguide portion A in a manner similar to those in the above-mentioned first embodiment. From the viewpoint of enhancing the optical transmission efficiency, it is preferable in this embodiment that the light beams narrowed down by the first and second lens portions 31 and 42 on the light-emitting side are emitted so that the converged light beams enter the end surfaces of the light-receiving cores 3B. Also, in this embodiment, the position of a finger having touched the display screen of the display 11 in the touch panel 10 (with reference to FIG. 2) is accurately detected.

In the above-mentioned embodiments, the photosensitive resin is used to form the under cladding layer 2. In place of this, however, a resin film functioning as the under cladding layer 2 may be prepared and used as it is as the under cladding layer 2. Alternatively, in place of the under cladding layer 2, a substrate and the like with a metal film (a metal material) or a metal thin film (a metal material) formed on the surface thereof may be used as a body having a surface on which the cores 3A and 3B are to be formed.

In the above-mentioned embodiments, the optical waveguides $W_1$ and $W_2$ for the touch panel are in the form of the rectangular frame. However, the two L-shaped optical waveguide portions A, B($B_1$) constituting the optical waveguides $W_1$ and $W_2$ for the touch panel in the form of the rectangular frame may be separate from each other. A manufacturing method thereof may include the step of cutting into two L-shaped configurations in place of the step of cutting into the above-mentioned rectangular frame shape.

Also, in the above-mentioned embodiments, the optical waveguides $W_1$ and $W_2$ for the touch panel are used after being removed from the above-mentioned base 1. However, the optical waveguides $W_1$ and $W_2$ for the touch panel may be used while being formed on the surface of the base 1 without being removed therefrom.

Next, examples of the present invention will be described. It should be noted that the present invention is not limited to the examples.

EXAMPLES

Material for Formation of Under Cladding Layer and Over Cladding Layer

A material for formation of an under cladding layer and an over cladding layer was prepared by mixing 100 parts by weight of an epoxy resin having an alicyclic skeleton (EP4080E manufactured by ADEKA Corporation) (component A), and 2 parts by weight of a photo-acid generator (CPI-200K manufactured by SAN-APRO Ltd.) (component B) together.

Material for Formation of Cores

A material for formation of cores was prepared by dissolving 40 parts by weight of an epoxy resin having a fluorene skeleton (OGSOL EG manufactured by Osaka Gas Chemicals Co., Ltd.) (component C), 30 parts by weight of a polyfunctional fluorene epoxy (EX-1040 manufactured by Nagase ChemteX Corporation) (component D), 30 parts by weight of 1,3,3-tris{4-[2-(3-oxetanyl)]butoxyphenyl}butane (component E), and one part by weight of the aforementioned component B in 40.8 parts by weight of ethyl lactate.

Production of Optical Waveguide for Touch Panel

The optical waveguide for the touch panel according to the second embodiment shown in FIGS. 6A and 6B (in which the third and fourth lens portions were not formed on the light-receiving side) was produced in a manner to be described below. Specifically, the material for the formation of the above-mentioned under cladding layer was applied to the surface of a polyethylene naphthalate (PEN) film [160 mm×160 mm×188 μm (thick)] with an applicator. Thereafter, exposure by the use of irradiation with ultraviolet light at 2000 mJ/cm² was performed. Subsequently, a heating treatment was performed at 100° C. for 15 minutes to form the under cladding layer. The thickness of this under cladding layer was 20 μm when measured with a contact-type film thickness meter. The refractive index of this under cladding layer at a wavelength of 830 nm was 1.510.

Then, the material for the formation of the above-mentioned cores was applied to the surface of the above-mentioned under cladding layer with an applicator. Thereafter, a drying process was performed at 100° C. for 15 minutes. Next, a synthetic quartz chrome mask (exposure mask) formed with an opening pattern identical in shape with the pattern of the cores (including the first lens portions) was prepared over the resulting core material so as to conform to the dimensions of the first lens portions shown in Table 1 below (Examples 1 to 3). Then, exposure by the use of irradiation with ultraviolet light at 4000 mJ/cm² was performed by a proximity exposure method through the above-mentioned chrome mask. Thereafter, a heating treatment was performed at 80° C. for 15 minutes. Next, development was carried out using an aqueous solution of γ-butyrolactone to dissolve away an unexposed portion. Thereafter, a heating treatment was performed at 120° C. for 30 minutes to form the cores. The thickness (height) and width of the cores (except the widened portion of a substantially sectorial shape of the first lens portions) were shown in Table 1 below (Examples 1 to 3). The above-mentioned dimensions were measured with an SEM (electron microscope). The refractive index of the cores at a wavelength of 830 nm was 1.592.

TABLE 1

| | First Lens Portions | | Cores | |
|---|---|---|---|---|
| | Radius of Curvature $R_1$ (μm) | Taper Angle $α_1$ (Degree) | Height (μm) | Width (μm) |
| Example 1 | 300 | 26 | 10 | 10 |
| Example 2 | 1000 | 32 | 50 | 50 |
| Example 3 | 2000 | 36 | 100 | 100 |

Then, the material for the formation of the over cladding layer was applied to the surface of the above-mentioned under cladding layer with an applicator so as to cover the cores. Next, molding dies made of quartz for the formation of the over cladding layer were prepared so as to conform to the radius of curvature ($R_2$) of the lens surface of the second lens portion shown in Table 2 below (Examples 1 to 3). Each of these molding dies was formed with a recessed portion defined by a die surface complementary in shape to the surface of the over cladding layer (including the second lens portion). The above-mentioned molding dies were pressed so that a distance ($L_1$) from the center of curvature of the lens surfaces of the first lens portions to the center of curvature of the lens surface of the second lens portion took values listed in Table 2 below. Next, a light shielding mask was placed on a surface portion of the above-mentioned molding dies corresponding to a portion where the over cladding layer was not formed (a portion where the first lens portions were exposed to the outside air). Then, exposure by the use of irradiation with ultraviolet light at 2000 mJ/cm² was performed through the above-mentioned molding dies. Thereafter, a heating treatment was performed at 80° C. for 15 minutes. Thereafter, the molding dies were removed. Next, development was carried out using an aqueous solution of γ-butyrolactone to dissolve away an unexposed portion. Thereafter, a heating treatment was performed at 120° C. for 30 minutes. This provided the over cladding layer including the second lens portion. The height of this over cladding layer was 1000 μm when measured under a microscope (manufactured by Keyence Corporation). The refractive index of this over cladding layer at a wavelength of 830 nm was 1.510. The width ($D_1$) of an outside air portion to which the first lens portions were exposed on the light-emitting side, and the clearance ($E_1$) between the lens surfaces of the first lens portions and the second lens portion were also listed in Table 2 below.

TABLE 2

| | Second Lens Portion Radius of Curvature $R_2$ (μm) | Distance from Center of Curvature of First Lens Portions to Center of Curvature of Second Lens Portion $L_1$ (μm) | Width of Outside Air Portion $D_1$ (μm) | Clearance $E_1$ (μm) |
|---|---|---|---|---|
| Example 1 | 470 | 600 | 1400 | 500 |
| Example 2 | 4800 | 1000 | 7300 | 4700 |
| Example 3 | 7000 | 9000 | 13800 | 8400 |

Then, the resultant structure was cut together with the above-mentioned PEN film into two L-shaped optical waveguide portions by punching using a blade. This provided the two L-shaped optical waveguide portions (having outside dimensions of 66.3 mm×70.0 mm and a width of 10 mm) with the PEN film.

Evaluation

The two L-shaped optical waveguide portions obtained with the PEN film were opposed to each other on the surface of a glass epoxy board, and placed to define a rectangular frame. Then, alignment was performed using a microscope so that the optical axes of the light-emitting cores and the light-receiving cores in face-to-face relationship were coincident with each other. Then, a VCSEL (manufactured by Optowell Co., Ltd.) for emitting light beams with a wavelength of 850 nm as a light-emitting element was coupled to a predetermined portion provided at an outer end edge of the light-emitting L-shaped optical waveguide portion with an ultraviolet curable adhesive. Also, a CMOS linear sensor array (manufactured by TAOS Inc.) as a light-receiving element was coupled to a predetermined portion provided at an outer end edge of the light-receiving L-shaped optical waveguide portion with an ultraviolet curable adhesive. Then, a controller for the above-mentioned light-receiving element was connected through a flexible printed board to a USB-type import unit (manufactured by National Instruments Corporation), and was further connected through a USB port to a computer. Then, light beams (with a wavelength of 850 nm) with an intensity of 2 mW were emitted from the above-mentioned light-emitting element, and evaluations of operation as a touch panel were performed.

As a result, in Examples 1 to 3 described above, it was found the light beams emitted from the above-mentioned light-emitting element passed through the light-emitting L-shaped optical waveguide portion, traveled in a lattice form across a coordinate input area, thereafter passed through the light-receiving L-shaped optical waveguide portion, and finally reached the above-mentioned light-receiving element. Further, when the above-mentioned coordinate input area was touched with a finger, coordinates appeared on a computer screen, and the ability to operate as a touch panel was recognized.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide for a touch panel, comprising:
    cores, and
    an over cladding layer formed so as to cover the cores,
    the optical waveguide being provided along a peripheral portion of a display screen of a display of the touch panel,
    the cores including a light-emitting core for emitting light beams and having an end portion positioned in a first side portion of the display screen of said display,
    the end portion of said light-emitting core being formed as a first lens portion in such a manner as to protrude from an edge portion of said over cladding layer and to be exposed to the outside air,
    said first lens portion having a first lens surface of an arcuate shape as seen in plan view which bulges outwardly,
    the over cladding layer including a second lens portion formed as an extension of said over cladding layer and corresponding to said first lens portion, said second lens portion being spaced apart from the first lens surface of said first lens portion,
    said second lens portion having a second lens surface of an arcuate shape as seen in sectional side view which bulges outwardly.

2. The optical waveguide for the touch panel according to claim 1, wherein:
    said first lens portion has a width increasing gradually toward an end surface thereof closer to the second lens portion to have a substantially sectorial shape; and
    an arcuate surface portion of the substantially sectorial shape is formed as said first lens surface.

3. The optical waveguide for the touch panel according to claim 2, wherein:
    the cores include a light-receiving core for receiving said emitted light beams and having an end portion positioned in a second side portion of the display screen of said display;
    the end portion of said light-receiving core is formed as a third lens portion in such a manner as to protrude from another edge portion of said over cladding layer and to be exposed to the outside air;
    said third lens portion has a third lens surface of an arcuate shape as seen in plan view which bulges outwardly;
    the over cladding layer further includes a fourth lens portion formed as another extension of said over cladding layer and corresponding to said third lens portion, said fourth lens portion being spaced apart from the third lens surface of said third lens portion; and
    said fourth lens portion has a fourth lens surface of an arcuate shape as seen in sectional side view which bulges outwardly.

4. The optical waveguide for the touch panel according to claim 3, wherein
    said third lens portion has a width increasing gradually toward an end surface thereof closer to the fourth lens portion to have a substantially sectorial shape, and
    an arcuate surface portion of the substantially sectorial shape is formed as said third lens surface.

5. The optical waveguide for the touch panel according to claim 4, wherein:
    said cores are formed on a predetermined portion of a surface of a body made of an under cladding material or a metal material; and
    said over cladding layer is formed on the surface of said body so as to cover said cores.

6. The optical waveguide for the touch panel according to claim 3, wherein:
    said cores are formed on a predetermined portion of a surface of a body made of an under cladding material or a metal material; and
    said over cladding layer is formed on the surface of said body so as to cover said cores.

7. The optical waveguide for the touch panel according to claim 2, wherein:
    said cores are formed on a predetermined portion of a surface of a body made of an under cladding material or a metal material; and
    said over cladding layer is formed on the surface of said body so as to cover said cores.

8. The optical wave guide for the touch panel according to claim 1, wherein:
    the cores include a light-receiving core for receiving said emitted light beams and having an end portion positioned in a second side portion of the display screen of said display;
    the end portion of said light-receiving core is formed as a third lens portion in such a manner as to protrude from another edge portion of said over cladding layer and to be exposed to the outside air;
    said third lens portion has a third lens surface of an arcuate shape as seen in plan view which bulges outwardly;
    the over cladding layer further includes a fourth lens portion formed as another extension of said over cladding layer and corresponding to said third lens portion, said fourth lens portion being spaced apart from the third lens surface of said third lens portion; and
    said fourth lens portion has a fourth lens surface of an arcuate shape as seen in sectional side view which bulges outwardly.

9. The optical waveguide for the touch panel according to claim 8, wherein
    said third lens portion has a width increasing gradually toward an end surface thereof closer to the fourth lens portion to have a substantially sectorial shape, and
    an arcuate surface portion of the substantially sectorial shape is formed as said third lens surface.

10. The optical waveguide for the touch panel according to claim 9, wherein:
    said cores are formed on a predetermined portion of a surface of a body made of an under cladding material or a metal material; and
    said over cladding layer is formed on the surface of said body so as to cover said cores.

11. The optical waveguide for the touch panel according to claim 8, wherein:
    said cores are formed on a predetermined portion of a surface of a body made of an under cladding material or a metal material; and said over cladding layer is formed on the surface of said body so as to cover said cores.

12. The optical waveguide for the touch panel according to claim 1, wherein:

said cores are formed on a predetermined portion of a surface of a body made of an under cladding material or a metal material; and said over cladding layer is formed on the surface of said body so as to cover said cores.

13. A touch panel comprising:

a display including a display screen; and an optical waveguide including cores, and an over cladding layer formed so as to cover the cores, the optical waveguide being provided along a peripheral portion of the display screen of said display of the touch panel, the cores including a light-emitting core for emitting light beams and having an end portion positioned in a first side portion of the display screen of said display, the end portion of said light-emitting core being formed as a first lens portion in such a manner as to protrude from an edge portion of said over cladding layer and to be exposed to the outside air, said first lens portion having a first lens surface of an arcuate shape as seen in plan view which bulges outwardly, the over cladding layer including a second lens portion formed as an extension of said over cladding layer and corresponding to said first lens portion, said second lens portion being spaced apart from the first lens surface of said first lens portion, said second lens portion having a second lens surface of an arcuate shape as seen in sectional side view which bulges outwardly, the cores including a light-receiving core for receiving said emitted light beams and having an end surface positioned in a second side portion of the display screen of said display.

* * * * *